(12) United States Patent
Shin et al.

(10) Patent No.: US 9,031,007 B2
(45) Date of Patent: May 12, 2015

(54) SUPER FRAME STRUCTURE AND BEACON SCHEDULING METHOD FOR MESH NETWORKING

(75) Inventors: Chang Sub Shin, Daejeon (KR); Wun Cheol Jeong, Daejeon (KR); Anseok Lee, Gyeongsangbuk-Do (KR); So Young Hwang, Busan (KR); Seong Soon Joo, Daejeon (KR); Jong Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 832 days.

(21) Appl. No.: 12/554,551

(22) Filed: Sep. 4, 2009

(65) Prior Publication Data
US 2010/0085930 A1    Apr. 8, 2010

(30) Foreign Application Priority Data

Oct. 8, 2008   (KR) .................. 10-2008-0098789
Sep. 2, 2009   (KR) .................. 10-2009-0082555

(51) Int. Cl.
| | |
|---|---|
| H04W 4/00 | (2009.01) |
| H04W 72/04 | (2009.01) |
| H04W 72/12 | (2009.01) |
| H04W 48/12 | (2009.01) |
| H04W 84/18 | (2009.01) |

(52) U.S. Cl.
CPC .......... *H04W 72/1278* (2013.01); *H04W 84/18* (2013.01); *H04W 48/12* (2013.01)

(58) Field of Classification Search
None
See application file for complete search history.

(56) References Cited

U.S. PATENT DOCUMENTS

| | | | |
|---|---|---|---|
| 2007/0064671 A1* | 3/2007 | Kim et al. .................... | 370/350 |
| 2007/0064742 A1* | 3/2007 | Shvodian ..................... | 370/503 |
| 2007/0076681 A1* | 4/2007 | Hong et al. .................. | 370/349 |
| 2008/0165746 A1* | 7/2008 | Sung et al. ................... | 370/337 |
| 2008/0259877 A1* | 10/2008 | Habetha ...................... | 370/336 |
| 2009/0225810 A1* | 9/2009 | Sugaya ....................... | 375/132 |
| 2009/0279487 A1* | 11/2009 | Reumerman et al. ......... | 370/329 |
| 2010/0039960 A1* | 2/2010 | Sugaya ....................... | 370/255 |
| 2010/0067428 A1* | 3/2010 | Cordeiro et al. .............. | 370/315 |
| 2010/0226258 A1* | 9/2010 | Sugaya ....................... | 370/241 |
| 2010/0302994 A1* | 12/2010 | Tachtatzis et al. ............ | 370/315 |

FOREIGN PATENT DOCUMENTS

| | | |
|---|---|---|
| EP | 1677456 A1 | 7/2006 |
| KR | 10-2008-0052034 | 6/2008 |

OTHER PUBLICATIONS

Ho-In Jeon et al., "BOP (Beacon-Only Period) and Beacon Scheduling for MEU (Mesh-Enabled USN) Devices", IEEE Xplore, Feb. 12-14, 2007, ICACT2007, pp. 1139-1142.

ChangSub Shin et al., "Beacon Collision Avoidance mechanism for TG4e MAC", IEEE 15-08-0618-01-004e, Sep. 2008, 16 pages.

* cited by examiner

*Primary Examiner* — Chi H Pham
*Assistant Examiner* — Soon-Dong D Hyun
(74) *Attorney, Agent, or Firm* — Staas & Halsey LLP

(57) ABSTRACT

A super frame structure supporting a mesh network, and a beacon scheduling method. The super frame structure and the beacon scheduling method may support a mesh topology in a beacon enabled mode, may have an algorithm that is simple and easily realized via beacon scheduling using a distribution method, and may easily adapt to changes in a network environment.

8 Claims, 8 Drawing Sheets

New joining node

FIG. 4

| Octets : 2 | Variable |
|---|---|
| SD Index | SD Bitmap |

FIG. 5A

| Octets : 1 | Variable |
|---|---|
| Beacon bitmap Specification | Beacon bitmap |

FIG. 5B

| Bits : 0-1 | 2-6 | 7 |
|---|---|---|
| The length of Bitmap(bytes) | Allocated number of SD | Reserved |

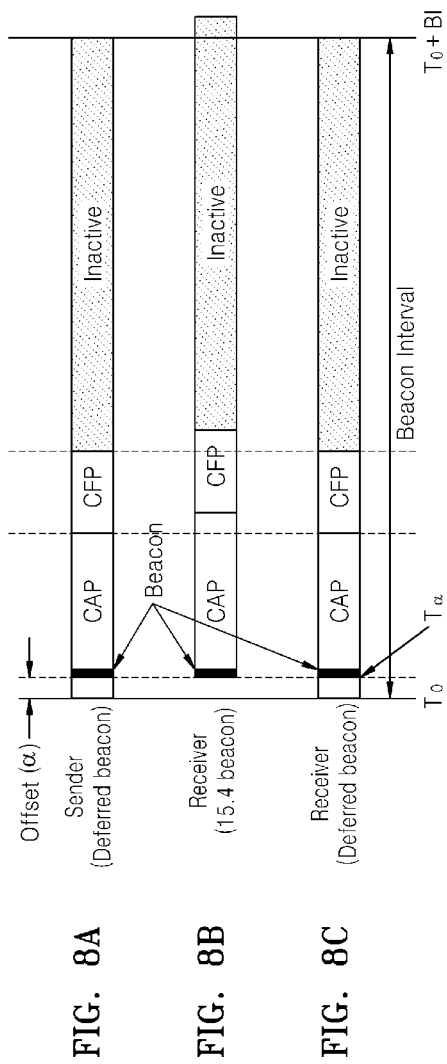

FIG. 9A

| Octets: 2 | 1 | 4/10 | 0/5/6/10/14 | 2 | Variable | Variable | Variable | 0/1 | 2 |
|---|---|---|---|---|---|---|---|---|---|
| Frame Control | Sequence Number | Addressing fields | Auxiliary Security Header | Superframe Specification | GTS fields | Pending Address fields | Beacon Payload | Deferred time | FCS |
| MHR | | | | MAC Payload | | | | | MFR |

FIG. 9B

| Bits: 0-3 | 4-7 | 8-11 | 12 | 13 | 14 | 15 |
|---|---|---|---|---|---|---|
| Beacon Order | Superframe Order | Final CAP Slot | Battery Life Extension (BLE) | Deferred Beacon Indication | PAN Coordinator | Association Permit |

SUPER FRAME STRUCTURE AND BEACON SCHEDULING METHOD FOR MESH NETWORKING

CROSS-REFERENCE TO RELATED PATENT APPLICATION

This application claims the benefit of Korean Patent Application Nos. 10-2008-0098789, filed on Oct. 8, 2008 and 10-2009-0082555, filed on Sep. 2, 2009, in the Korean Intellectual Property Office, the disclosure of which is incorporated herein in its entirety by reference.

BACKGROUND OF THE INVENTION

1. Field of the Invention

The present invention relates to a beacon scheduling method, and more particularly, to a super frame structure and a beacon scheduling method supporting a mesh network.

2. Description of the Related Art

One sensor network media access control (MAC) technology is IEEE802.15.4 MAC. The IEEE802.15.4 MAC forms a network having a tree structure starting from a personal area network (PAN) coordinator (PNC), wherein each node is assigned with an independent active duration according to a scheduling method supported by a user and then communicates during the corresponding active duration. However, in such a beacon enabled mode, a mesh network structure is not supported since only a tree network structure is supported. Also, since a mode for avoiding beacon collision is performed in an upper layer, an algorithm processing delay time increases and efficiency decreases.

SUMMARY OF THE INVENTION

The present invention provides a super frame structure for supporting a mesh network in a beacon enabled mode, and a beacon scheduling method using a distribution method.

Additional aspects will be set forth in part in the description which follows and, in part, will be apparent from the description, or may be learned by practice of the presented embodiments.

According to an aspect of the present invention, there is provided a beacon scheduling method of a node in a mesh network, wherein a beacon interval indicating a beacon transmission period of a network coordinator includes a plurality of super frames, the beacon scheduling method including: receiving beacon allocation information from neighboring nodes within a transmission range; and selecting a super frame to which a beacon is not allocated from among the plurality of super frames as a super frame for transmitting a beacon of the node, based on the beacon allocation information.

The beacon scheduling method may further include: broadcasting beacon allocation information of the node to the neighboring nodes; receiving a notice of beacon allocation repetition from one of the neighboring nodes that detected beacon allocation repetition; and selecting another super frame that does not overlap with another node, based on the notice of beacon allocation repetition, so as to avoid beacon collision.

The beacon scheduling method may further include: receiving beacon collision information from one of the neighboring nodes that detected a beacon collision; and selecting another super frame that does not overlap with another node, when a super frame having the beacon collision is the selected super frame of the node, so as to avoid beacon collision.

According to another aspect of the present invention, there is provided a beacon scheduling method of a node in a mesh network, the beacon scheduling method including: delaying a time of beacon transmission to avoid beacon collision; and transmitting a beacon comprising an offset value between a start time of a super frame and a beacon transmission time after the delaying of the time of beacon transmission.

BRIEF DESCRIPTION OF THE DRAWINGS

The above and other features and advantages of the present invention will become more apparent by describing in detail exemplary embodiments thereof with reference to the attached drawings in which:

FIG. 4 is a diagram illustrating a field structure for indicating bitmap allocation information for beacon scheduling in a beacon frame, according to an embodiment of the present invention;

FIGS. 5A and 5B are diagrams illustrating field structures for indicating bitmap allocation information for beacon scheduling in a beacon frame, according to other embodiments of the present invention;

FIG. 8 is a diagram for describing a beacon transceiving method for preventing beacon collision, according to an embodiment of the present invention; and FIGS. 9A and 9B are diagrams illustrating beacon formats, wherein a time deferred value is inserted into a beacon frame, according to embodiments of the present invention.

DETAILED DESCRIPTION OF THE INVENTION

Figure 1:
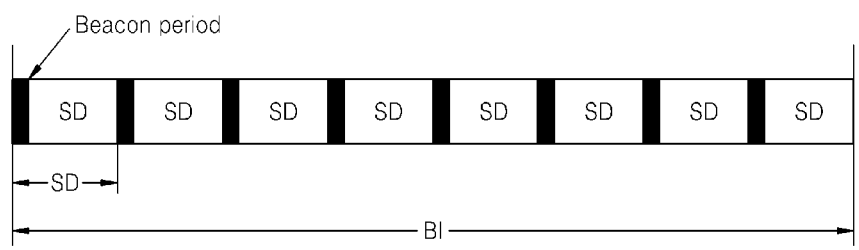
FIG. 1 is a diagram illustrating a super frame structure for supporting a beacon enabled mode in a mesh network, according to an embodiment of the present invention.

The present invention will now be described more fully with reference to the accompanying drawings, in which exemplary embodiments of the invention are shown. In the drawings, like reference numerals denote like elements. Also, while describing the present invention, detailed descriptions about related well-known functions or configurations that may diminish the clarity of the points of the present invention are omitted.

When a part "includes" an element, the part may include another element, unless otherwise defined. Each element performs at least one function or operation, and may be realized in hardware, software, or in a combination of hardware and software.

Terms used in the present specification will now be defined.

Personal Area Network (PAN) Coordinator (PNC): A top node that starts and manages a sensor network Coordinator: A sensor node having a routing function Beacon Enabled Mode: A network operating method wherein all coordinators can periodically transmit a beacon corresponding to each coordinator Beacon Scheduling: A method of managing a beacon transmission time of all nodes so as to avoid beacon collision Super Frame: A periodical frame structure for entire nodes in a network to operate with duty-cycle.

A beacon enabled mode in the IEEE802.15.4 MAC standard for a sensor network cannot support a mesh network. Accordingly, a super frame structure and a beacon scheduling method considering a mesh network will be suggested herein. A super frame consists of a super frame order (SO) value and a beacon order (BO) value, wherein SO relates to a length of the super frame and BO relates to a beacon interval (BI), i.e. an interval for a PNC to transmit a beacon frame. A super frame duration (SD) is formed by being slotted. A node in a network performs beacon scheduling by selecting a blank SD by receiving neighboring node information of a neighboring node from the neighboring node. A beacon scheduling method of the present invention is simple since it uses a distribution method, in a MAC layer without changing a conventional super frame structure in the IEEE802.15.4 MAC standard. And, the beacon scheduling method has high adaptability since the beacon scheduling method is not affected by network topology.

In order for all nodes to support a mesh network in a beacon enabled mode that periodically transmits a beacon signal, the beacon signal must be scheduled first without collision. In a current supporting method of a MAC layer for scheduling beacons in the IEEE802.15.4 MAC standard, beacon collision is avoided by using beacon start time information between a parent node and a child node of a super frame, in a tree structure. However, such a supporting method does not support a mesh network because a beacon scheduling method is not provided for a neighboring node, other than a parent node and a child node.

A beacon scheduling method includes a central method and a distribution method. In the central method, a PAN coordinator schedules beacons of all nodes, and when a network structure changes or a node is disordered, the beacons need to be re-scheduled.

Accordingly, a beacon scheduling method using a distribution method is suggested. All nodes in a network receive a beacon signal of a neighboring node via scanning. Since the beacon signal includes beacon allocation information of a neighboring node in bitmap form, a node is able to determine its own beacon allocation slot.

FIG. 1 is a diagram illustrating a super frame structure for supporting a beacon enabled mode in a mesh network, according to an embodiment of the present invention.

A beacon can be scheduled using a distribution method by using a conventional super frame. All nodes have the same BO and SO values, and a plurality of SDs are included in a BI. An SD is slotted, and a slot in which the SD starts is a beacon period (or beacon slot) in which a beacon is transmitted. In the current embodiment, the super frame structure includes 8 SDs, thus 8 beacon periods or beacon slots.

A node selects an SD of the node according to a beacon scheduling method, and then transmits the beacon at a beacon period of a corresponding SD in a following BI. Also, the node supports a mesh network by tracking a beacon of a neighboring node. The node may use BLE (Battery Life Extension) so as to reduce energy.

The mesh network has a super frame structure, wherein a plurality of super frames are included in a BI.

Figure 2:
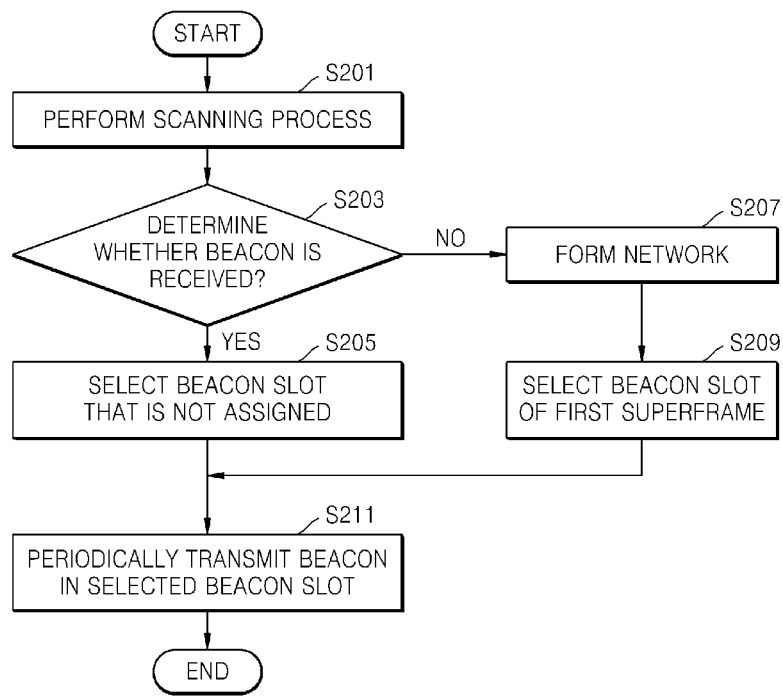
FIG. 2 is a flowchart illustrating a beacon scheduling method using a distribution method, according to an embodiment of the present invention.

FIG. 2 is a flowchart illustrating a beacon scheduling method using a distribution method, according to an embodiment of the present invention. In the current embodiment of the present invention, each node includes one neighboring node, but may include more than one neighboring node.

In operation S201, a joining node that is to join a network performs a scanning process (listens to a beacon signal of a neighboring node A) so as to obtain information about a neighboring node B of the neighboring node A. The joining node may use a MAC layer management entity (MLME)-SCAN.request primitive so as to scan channels on a channel list. The joining node searches for all nodes that transmit a beacon in the maximum BI.

In operation S203, it is determined whether the joining node received a beacon of the neighboring node A. The joining node obtains beacon allocation information of the neighboring nodes A and B from the received beacon of the neighboring node A. The beacon allocation information is expressed in a bitmap, and the neighboring node A shares the beacon allocation information with the joining node.

The joining node selects a beacon slot that is not allocated by using the beacon allocation information in operation S205. For example, the joining node may select a super frame having a blank beacon slot that is not set to 1 or set to 0 as a super frame for transmitting a beacon of the joining node, based on all pieces of beacon allocation information received from neighboring nodes. The joining node may determine beacon allocation information of a 2 hop-distance node based on the beacon allocation information of the neighboring node.

If the joining node did not receive the beacon of the neighboring node A, the joining node forms a network, and defines a super frame structure, thus acting as a PNC, in operation S207. Then, the joining node operates the network by selecting a beacon slot of the first super frame in a BI, as a beacon slot of the joining node in operation S209.

After selecting the beacon slot, the joining node periodically transmits a beacon during the selected beacon slot in operation S211. The joining node updates information about the neighboring nodes by receiving beacons of the neighboring nodes, and periodically broadcasts the information about the neighboring nodes in the beacon of the joining node.

When each node detects beacon collision, the node notifies neighboring nodes about the beacon collision.

Figure 3A:
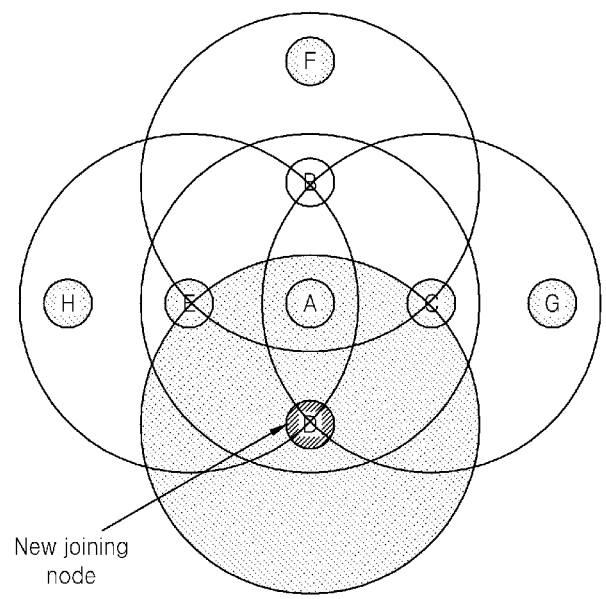
FIGS. 3A through 3C are diagrams for describing a beacon scheduling process according to an embodiment of the present invention.
Figure 3B:
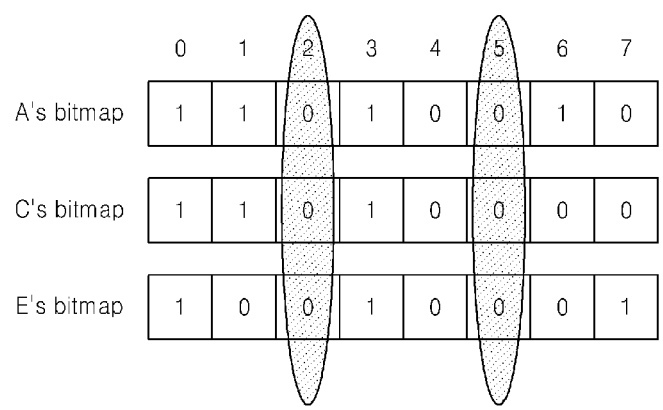
Figure 3C:
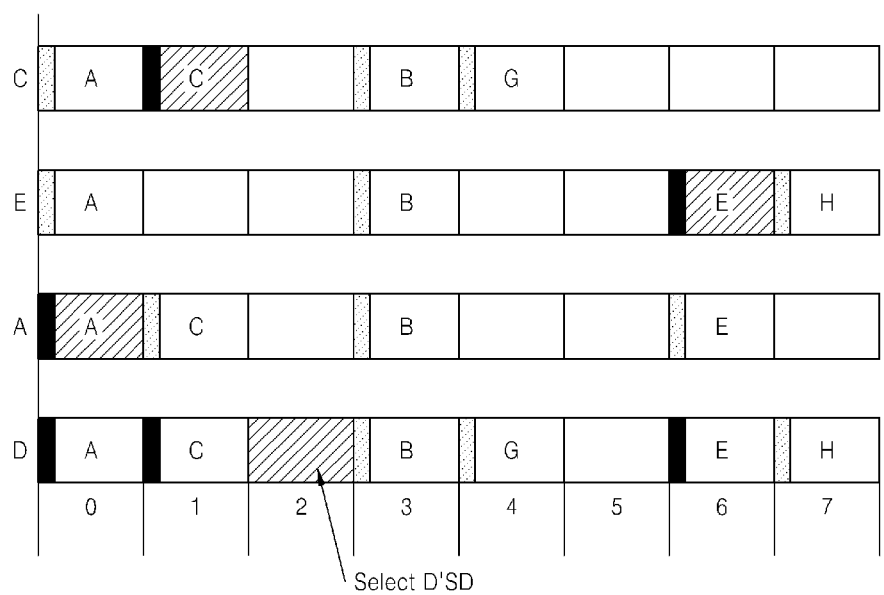

FIGS. 3A through 3C are diagrams for describing a beacon scheduling process according to an embodiment of the present invention.

FIG. 3A illustrates an example of network topology, wherein each circle having a node as a center indicates a data transmission range of the node. For a node D to newly join a network, the node D receives beacons of neighboring nodes A, C, and E.

The beacons of each of the nodes A, C, and E may include beacon allocation information of neighboring nodes in a bitmap, as shown in FIG. 3B. For example, a beacon slot that is being used may be indicated as 1, and a beacon slot that is not being used may be indicated as 0. A beacon slot is a period where a super frame starts, and may include at least one slot. A beacon slot number corresponds to a super frame number. Referring to FIG. 3B, it is shown in a bitmap that $0^{th}$, $1^{st}$, $3^{rd}$, and $6^{th}$ beacon slots of the node A are used by the node A and neighboring nodes of the node A. Similarly, it is shown in bitmaps that $0^{th}$, $1^{st}$, and $3^{rd}$ beacon slots of the node C, and $0^{th}$, $3^{rd}$, and $7^{th}$ beacon slots of the node E are used respectively by the node C, node D, and neighboring nodes of the node C and the node E. The node D, which is a joining node, may determine that $2^{nd}$ and $5^{th}$ beacon slots are blank slots that are not allocated, based on beacon allocation information of the nodes A, C, and E.

The node D may select the 2nd or 5th beacon slot as its own beacon slot. A slot may be selected by using any method, such as selecting a slot according to a slot number or arbitrarily. Referring to FIG. 3C, beacon allocation information of the nodes A, C, D, and E are expressed in a super frame. The node D selects the 2nd beacon slot as its own beacon slot.

FIG. 4 is a diagram illustrating a field structure for indicating beacon allocation information in a bitmap for beacon scheduling in a beacon frame, according to an embodiment of the present invention.

An SD index subfield indicates an SD number that is allocated to a node transmitting a beacon. An SD bitmap subfield may be in $2^{(BO-SO)}$ bits length, and indicates beacon allocation information of a neighboring node. The SD bitmap subfield may be indicated via a bitmap method that orderly represents the schedule of beacons. When a beacon is allocated to a corresponding SD, a corresponding bit is set to 1.

FIGS. 5A and 5B are diagrams illustrating field structures for indicating beacon allocation information in a bitmap for beacon scheduling in a beacon frame, according to other embodiments of the present invention.

Referring to FIG. 5A, a beacon bitmap specification field may be 1 byte in length and contains information about a subfield. A beacon bitmap field having a variable length according to a network structure is a bitmap allocation field for indicating actual beacon allocation information in a bitmap.

FIG. 5B is a lower subfield structure of the beacon bitmap specification field of FIG. 5A. First 2 bits indicate a length of a variable bitmap allocation field in bytes, and second through sixth bits indicate a number of a beacon allocation slot. The remaining 1 bit is a reserved bit.

Figure 6:
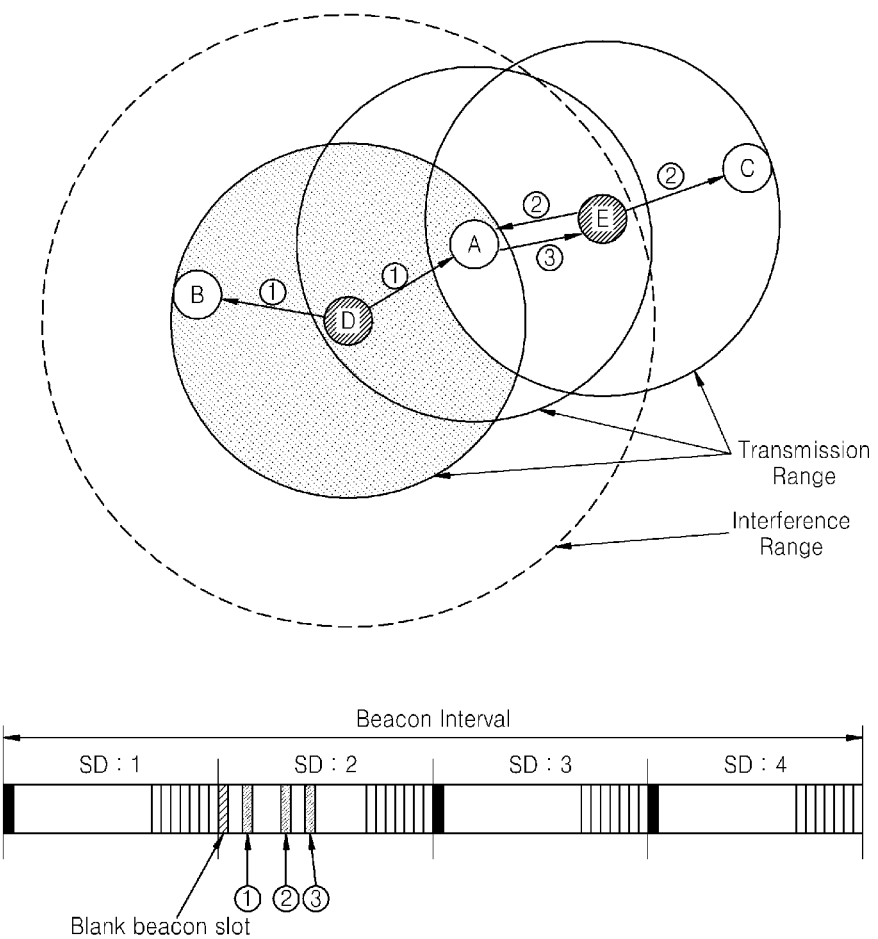
FIG. 6 is a diagram for describing a method of solving a beacon slot collision problem that may occur when a beacon is allocated using a distribution method, according to an embodiment of the present invention.

FIG. 6 is a diagram for describing a method of solving a beacon slot collision problem that may occur when a beacon is allocated using a distribution method, according to an embodiment of the present invention.

Nodes D and E, which join a network, may each simultaneously allocate the same beacon slot in a second SD (SD:2) as their own beacon slot.

After selecting the beacon slot, the nodes D and E broadcast beacon allocation information to neighboring nodes in operations ① and ②. Here, the nodes D and E transmit data in the same contention access period (CAP) based on competition. In the current embodiment of the present invention, the node D wins the competition, and thus transmits data first in operation ①. After backing off while the node D transmits the data, the node E then transmits data so as to transmit beacon allocation information in operation ②.

A node A, which is within transmission ranges of the nodes D and E, receives the beacon allocation information of the nodes D and E. The node A determines that the beacon slot overlaps, and determines which node transmitted the beacon allocation information first. The node A provides beacon overlap allocation information to the node E, which has a lower priority than the node D, in operation ③. The beacon overlap allocation information may also be transmitted in the same CAP.

Upon receiving the beacon overlap allocation information from the node A, the node E returns back to an initial process for allocating another slot. The node D, which does not receive the beacon overlap allocation information, transmits a beacon in the allocated slot in a following BI.

Figure 7:
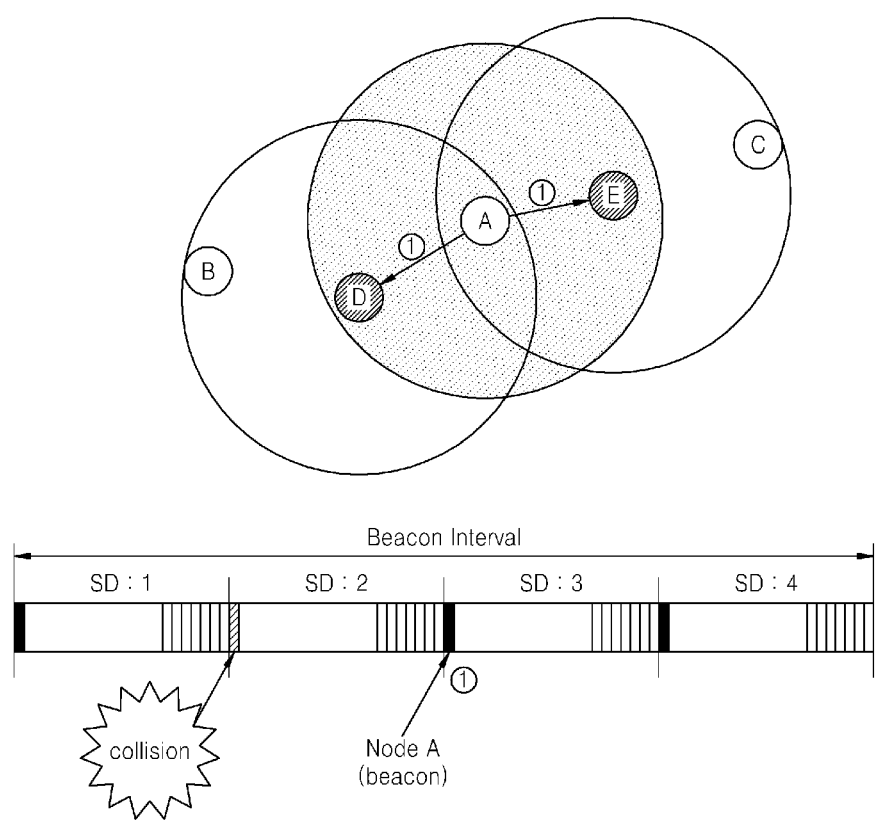
FIG. 7 is a diagram for describing a method of notifying a neighboring node that beacon slots continuously collide since the beacon slots overlap, according to an embodiment of the present invention.

FIG. 7 is a diagram for describing a method of notifying a neighboring node that beacon slots continuously collide since the beacon slots overlap, according to an embodiment of the present invention.

When a node detects that a collision continuously occurs in a certain beacon slot, the node notifies neighboring nodes about the collision. Referring to FIG. 7, a node A detects that a beacon slot of a second SD (SD:2) continuously collides, and thus notifies neighboring nodes in operation ① about the collision by transmitting a beacon during a beacon slot of a third SD (SD:3) of the node A.

Nodes D and E, which have beacon slots that collide, from among the neighboring nodes that received the information related to the collision, stop transmitting beacons and select new beacon slots. The nodes D and E transmit slot allocation information based on competition during an SD of a newly selected beacon slot. Here, the method of FIG. 6 is used so as to prevent slots from being overlapped. Once beacon slots are successfully allocated, neighboring nodes update beacon allocation information.

FIG. 8 is a diagram for describing a beacon transceiving method for preventing beacon collision, according to an embodiment of the present invention.

A transmission node performs clear channel assessment (CCA) and back-off, and transmits a beacon. The beacon includes an offset value α between a starting time of a super frame and an actual beacon transmitting time. A reception node adjusts a following beacon reception time by using the offset value α of the received beacon.

Referring to FIG. 8, in order avoid a collision, a node A that operates according to a beacon transmitting algorithm of the present invention transmits a beacon after delaying it for a predetermined time according to CCA or carrier sense multiple access with collision avoidance (CSMA-CA), and the beacon includes an offset value due to the delay of the beacon.

A node B that operates according to the conventional IEEE 802.15.4 standard sets a starting time Tα of a super frame as a beacon reception time. Accordingly, a following beacon reception time is set to Tα+BI.

Meanwhile, a node C that operates according to the beacon transmitting algorithm of the present invention adjusts a starting time of a super frame considering an offset value. Accordingly, a following beacon reception time is set to Tα−α+BI.

FIGS. 9A and 9B are diagrams illustrating beacon formats, wherein a time deferred value is inserted into a beacon frame, according to embodiments of the present invention. Descriptions about a field identical to a field included in a beacon payload of the conventional IEEE 802.15.4 MAC standard will be omitted herein.

A deferred time field indicates the number of a UnitBackoffPeriod.

A super frame specification field includes a deferred beacon indication subfield as shown in FIG. 9B, and the deferred beacon indication subfield indicates a delay before transmitting a beacon.

According to the present invention, mesh topology is supported in a beacon enabled mode, and a beacon scheduling method is simple and easily realized since a distribution method is used. Also, the beacon scheduling method easily adapts to changes in a network environment. Accordingly, the beacon scheduling method may be applied to a sensor application wherein high reliability and short delay are required.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

Terms used herein are for describing the present invention, and are not intended to limit the meanings thereof or the scope of the invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A beacon scheduling method of a joining node that is to join a network, comprising:
    receiving beacon allocation information from neighboring nodes within a transmission range; and
    selecting a vacant beacon slot which is not occupied by the neighboring nodes as the joining node's assigned beacon slot based on the beacon allocation information,
    wherein the beacon allocation information represents a schedule of beacons transmitted from neighboring nodes.

2. The beacon scheduling method of claim 1, wherein the beacon allocation information is expressed in a bitmap that orderly represents the schedule of beacons.

3. The beacon scheduling method of claim 1, further comprising broadcasting beacon allocation information of the node to the neighboring nodes.

4. The beacon scheduling method of claim 1, wherein the receiving beacon allocation information comprising:
    searching for all nodes that transmit a beacon within a maximum Beacon Interval (BI);
    receiving beacon allocation information the neighboring nodes.

5. A beacon collision avoidance method of a node, comprising:
    receiving beacon allocation information from neighboring nodes within a transmission range; and
    determining whether the neighboring nodes' beacon slots are collided, based on the beacon allocation information; and
    determining which neighboring node transmitted the beacon allocation information first, when the neighboring nodes' beacon slots are collided;
    providing beacon collision information to a neighboring node which transmits the beacon allocation information later.

6. The beacon scheduling method of claim 5, wherein the receiving beacon allocation information comprises receiving beacon allocation information within the same contention access period (CAP).

7. The beacon scheduling method of claim 5,
    wherein the receiving beacon allocation information comprises receiving beacon allocation information with Superframe Duration (SD) index value from the neighboring nodes.

8. A beacon scheduling method of a receiving node in a network, comprising:
    receiving a beacon comprising an offset value that reflects delay time due to clear channel assessment (CCA); and
    adjusting an reception time of the beacon based on the offset value,
    wherein the adjusting the reception time comprises setting a sum of a start time of a superframe and the offset value as the reception time of the beacon.

* * * * *